Figure 12:
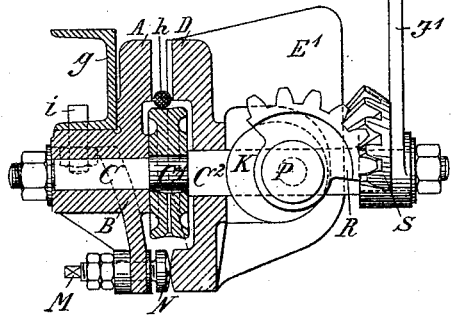

(No Model.) 3 Sheets—Sheet 1.
T. OTTO.
GRIPPER FOR BUCKETS OF ROPEWAYS.
No. 452,550. Patented May 19, 1891.
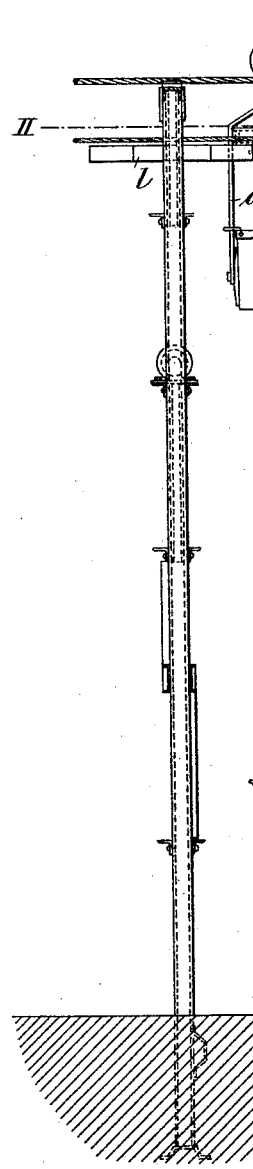
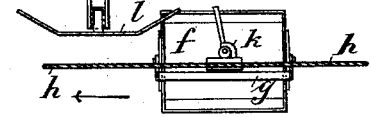
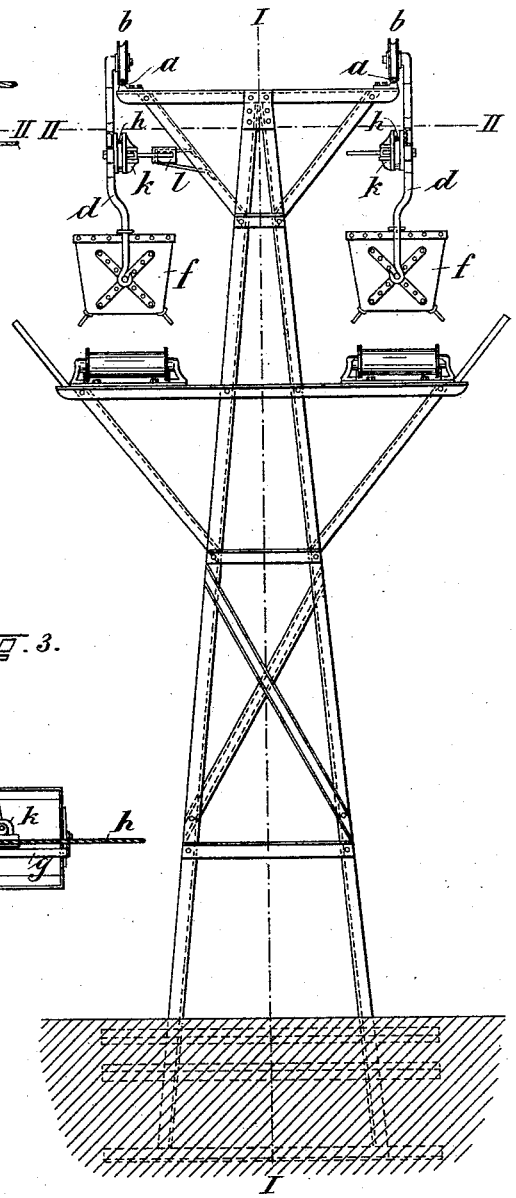
Witnesses:
Chas. W. Coulroye
B. W. Sommers
Inventor:
Theodor Otto

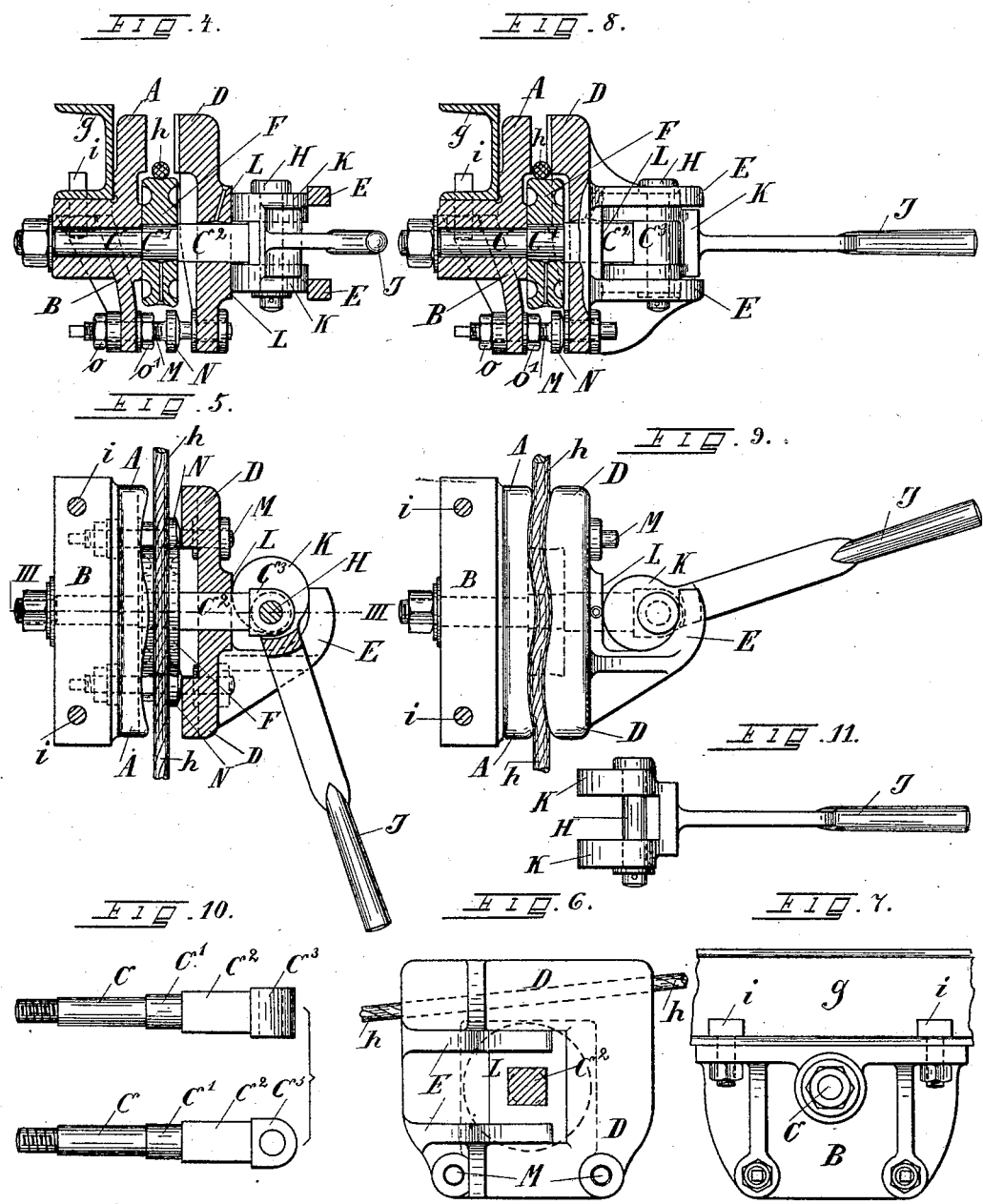

(No Model.) 3 Sheets—Sheet 3.

T. OTTO.
GRIPPER FOR BUCKETS OF ROPEWAYS.

No. 452,550. Patented May 19, 1891.

Witnesses:
Chas. W. Coubrye
B. W. Sommers

Inventor:
Theodor Otto
Henry Otto
Atty.

UNITED STATES PATENT OFFICE.

THEODOR OTTO, OF SCHKEUDITZ, ASSIGNOR TO THE FIRM OF J. POHLIG, OF COLOGNE-ON-THE-RHINE, GERMANY.

GRIPPER FOR BUCKETS OF ROPEWAYS.

SPECIFICATION forming part of Letters Patent No. 452,550, dated May 19, 1891.

Application filed September 20, 1890. Serial No. 365,646. (No model.) Patented in France December 28, 1885, No. 173,193; in Austria-Hungary August 6, 1887, No. 11,247 and No. 34,479; in Belgium November 14, 1887, No. 79,533; in Italy June 30, 1888, XXII, 23,320, XLVII, 322, and in Spain June 30, 1888, No. 8,085.

*To all whom it may concern:*

Be it known that I, THEODOR OTTO, civil engineer, a subject of the King of Prussia, residing at Schkeuditz, Prussia, German Empire, have invented certain new and useful Improvements in Apparatuses or Grips for Buckets of Ropeways, (for which I have obtained Letters Patent in the following countries: in Austria-Hungary, Nos. 11,247/34,479, August 6, 1887; in France, patent of addition of December 30, 1887, to the Patent No. 173,193, of December 28, 1885; in Belgium, patent of addition No. 80,801, December 29, 1887, to the Patent No. 79,533, of November 14, 1887; in Italy, Vol. 22, No. 23,320, Vol. 47, No. 322, June 30, 1888, and in Spain, libro 6, folio 385, No. 8,085, June 30, 1888;) and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to a friction-grip, which serves for clamping the hauling-rope of ropeways in order to connect this rope by friction with the vehicle. The grips acting by friction which have heretofore been employed for this purpose present the inconvenience of being effective only in the case of horizontal or very slightly-inclined ropeways. Where there are, however, greater inclinations in the ropeway, and where accordingly the hauling-rope forms a greater angle with the horizontal plane, the clamping-surfaces of the grip do not act with certainty and the connection of the hauling-rope with the vehicle is relaxed, so that the latter is not transported up the incline and slides down the incline, especially if the rope has become slippery in moist weather or by grease. For obviating these defects, which are very dangerous in the working of ropeways, use is made, according to the aforesaid invention, of a grip having two vertical clamping-jaws, which are adapted to approach and recede from each other in the horizontal direction, so that they will firmly clamp the rope between them or release the same. The aforesaid grip includes a roller, which is arranged in a cavity formed between the two jaws and serves as a support for the hauling-rope when the vehicle stops and the connection is severed. This roller furthermore causes the hauling-rope to be always gripped at the proper point by the clamping-jaws. In lieu of the said roller an immovable projection may be employed for supporting the rope; but the roller is more advantageous, as it does not injure the hauling-rope. In order that the jaws of the apparatus shall grip the rope with certainty, their clamping-surfaces are corrugated, so as to bend the rope to a corrugated form, whereby the friction between the rope and clamping-jaws is considerably increased. The improved grip is, moreover, provided with devices for actuating its movable clamping-jaw.

Figure 14:
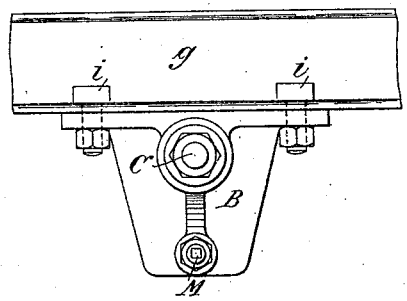
Figure 13:
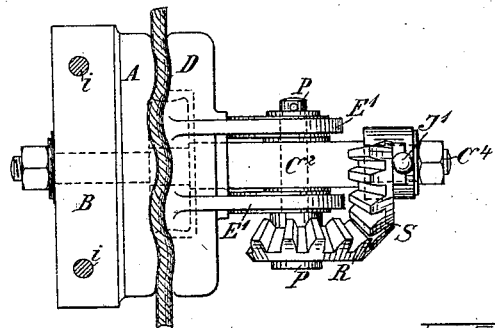
Figure 15:
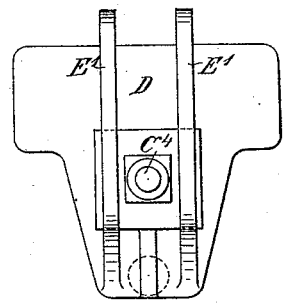
Figure 16:
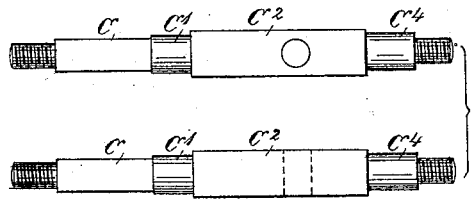

In the accompanying drawings, Figure 1 represents a longitudinal section on the line I I, Fig. 2, of part of the ropeway, having a vehicle provided with a grip constructed according to the present invention. Fig. 2 shows a transverse section of the ropeway, and Fig. 3 a horizontal section on the line II II, Figs. 1 and 2. Fig. 4 represents a vertical section of the improved grip on the line III III, Fig. 5; Fig. 5, an upper view, partly in section; Fig. 6, a front view, partly in section; and Fig. 7, a rear view of the said grip. Figs. 4 and 5 show the grip open, whereas Figs. 8 and 9, which represent a vertical section partly in elevation and an upper view of the grip, show the latter closed and gripping the hauling-rope. Figs. 10 and 11 represent details of the grip, and Figs 12 to 16 illustrate a modification of the same.

In the arrangement shown in Figs. 1 and 2, *a* designates the supporting or carrying rope whereon the truck *b* moves. From this truck is suspended the transporting-vessel *f*, through the medium of the frame or hanger *d*, to which the vessel *f* is pivoted.

Below the rope *a* is a hauling-rope *h*, which is moved in the well-known manner by a steam-engine or the like and with which the vehicle is connected when it is to be set in motion. For this purpose the grip *k* is secured to the horizontal bar *g*, which forms a part of the above-mentioned hanger *d*.

The most essential parts of the grip, Figs. 4 to 9, are the fixed clamping-jaw A and the movable clamping-jaw D. The fixed jaw A forms the upper part of a body B, which is firmly connected by screws $i$ or other means with the horizontal bar $g$. In this body is fixed the bolt or journal C, Fig. 10, the cylindrical part C' of which carries the roller F, while the movable jaw D is arranged to slide upon the part $C^2$ of suitable prismatic form. The outer end $C^3$ of the bolt serves for the reception of the vertical pivot H for the eccentric K, Fig. 11, which embraces the part $C^3$ of the said bolt like a fork. The jaw D, which is adapted to slide upon the part $C^2$ of the bolt, is further suitably guided by pins M, which are secured in the body B and extend through holes in the lower part of the said jaw. Collars N, formed on the pins M, limit the movement of the jaw D toward the fixed jaw A, as hereinafter described. Both parts of the eccentric K bear on the one hand against the sliding surface L of the jaw D and on the other hand against the hook-shaped projection E, extending from the said jaw.

As shown in Figs. 4, 5, 8, and 9, the clamping-surfaces of the jaws A and D, between which the rope can move, are parallel with each other and made of corrugated form, so that the rope will be bent to a corresponding form when the lever J, extending from the eccentric K, is moved from the position indicated in Fig. 5, wherein the grip is open, to the position indicated in Fig. 9, wherein the jaw D is in proximity to the jaw A, so that the grip is closed. By reason of this peculiar shape of the clamping-surfaces a very considerable friction is produced between the jaws and the hauling-rope, which friction, according to the inclination of the ropeway and the weight of the transporting-vessels, can be further increased by providing the clamping-surfaces with several corrugations, Fig. 13.

The grip cannot get accidentally released, owing to the position of the eccentric K after the clamping has been effected, Fig. 9. On moving the lever J from the position indicated in Fig. 9 to the position indicated in Fig. 5 the jaw D, through the medium of the eccentric K, acting upon the hook-shaped projections E, is removed from the fixed jaw A, thus releasing the vehicle from the hauling-rope $h$. The latter then rests quite freely upon the periphery of the roller F, supported between the two jaws A and D, Fig. 4, and turning loosely upon the part C' of the bolt when the hauling-rope is in motion and the vehicle is not coupled to the same. This roller F insures the proper position of the hauling-rope relatively to the clamping-surfaces of the grip, in which case a considerable inclination of the hauling-rope $h$ may occur, as indicated in Fig. 6, without interfering with the proper operation. When the lever J is moved from the position indicated in Fig. 5 to the position indicated in Fig. 9, the rope $h$ will be clamped between the jaws A and D, the collars N on the bolts M taking up the counter-pressure which occurs in the clamping of the rope. The bolts M can be adjusted in the body B by means of the nuts $o$ and $o'$ proportionately to the wear of the clamping-surfaces.

For coupling a vehicle to the draw-rope, the lever J is turned by hand, while for uncoupling it is turned back from the position shown in Fig. 9 to the position shown in Fig. 5, in the well-known manner by causing the lever to strike against a fixed bar $l$, Figs. 1, 2, and 3, which is arranged in any suitable manner at the point where the vehicle is to stop. As already stated, the rope may be supported between the jaws A and D by a suitable projection instead of the roller F.

In the described grip the lever J of the eccentric moves in a horizontal plane. Circumstances may, however, render it necessary that the lever J shall move in a vertical plane. A grip having a lever which moves in the vertical plane is illustrated in Figs. 12 to 15. In this arrangement the eccentric K is adapted to turn upon a horizontal bolt P, which can turn in the part $C^2$ of the bolt C, Fig. 16. With the eccentric K is connected the segment R of a bevel-wheel which engages with a similar segment S, to which the lever J' is attached. This lever is adapted to turn upon a part $C^4$ of the bolt C. The eccentric and lever are not shown in Fig. 15. As will be readily understood, on turning the lever J' the eccentric K will also perform a suitable turning movement, as above set forth. In this modified arrangement the jaw D has only one stop N, which is adjustable below and which receives the counter-pressure during the coupling. The double eccentric K here moves in a kind of frame E', projecting from the jaw D.

Having now described my invention, what I claim is—

1. A cable-grip comprising two jaws and a cable-support arranged between the same below the nip thereof, one of said jaws being stationary and the other having motion toward and from the stationary jaw and cable-support, for the purpose set forth.

2. A cable-grip comprising a stationary jaw, and a jaw adapted to have motion toward and from said stationary jaw, said jaws having gripping-faces provided with corrugations formed at right angles to the plane of the cable, for the purpose set forth.

3. A cable-grip comprising two jaws and a cable-support arranged between the same below the nip thereof, one of said jaws being stationary and provided with a stud and the other having motion on said stud toward and from the stationary jaw and cable-support, for the purpose set forth.

4. A cable-grip comprising a stationary jaw, a jaw having motion toward and from said stationary jaw on a stud projecting from the last-named jaw, and a cable-support consisting of a grooved wheel mounted loosely on the stud between the jaws, for the purpose set forth.

5. A cable-grip comprising two jaws and a cable-support arranged between the same below the nip thereof, one of said jaws being stationary and provided with a stud and the other movable on said stud toward and from the stationary jaw and cable-support, and a stop to limit the amplitude of motion of the movable jaw toward said stationary jaw and cable-support, for the purpose set forth.

6. A cable-grip comprising two jaws and a revoluble cable-support arranged between the same below the nip thereof, one of said jaws being stationary and the other having motion toward and from said stationary jaw and revoluble cable-support, for the purpose set forth.

7. A cable-grip comprising a stationary jaw, a jaw having motion toward and from said stationary jaw on a stud projecting from the last-named jaw, a grooved wheel loosely mounted on said stud between the jaws, and an eccentric connected with the stud and having bearing on the movable jaw, for the purpose set forth.

8. A cable-grip comprising a stationary jaw, a jaw having motion toward and from said stationary jaw on a stud projecting from the last-named jaw, a cable-support consisting of a grooved wheel loosely mounted on the stud between the jaws, and an adjustable stop adapted to limit the amplitude of motion of the movable jaw, for the purpose set forth.

9. A cable-grip comprising a stationary jaw, a jaw having motion toward and from said stationary jaw on a stud projecting from the last-named jaw, a cable-support consisting of a grooved wheel loosely mounted on the stud between the jaws, an eccentric connected with the stud and having bearing on the movable jaw, and an adjustable stop adapted to limit the amplitude of motion of the movable jaw, for the purpose set forth.

10. A cable-grip consisting of a stationary jaw, a jaw adapted to have motion toward and from the said stationary jaw on a stud projecting therefrom, an eccentric secured to a stud or pin having its bearings in the stud and having bearing on the movable jaw, a toothed segment on the eccentric-pin, and an operating-lever fulcrumed on the stud and provided with a toothed segment in gear with the like segment on the eccentric-pin, for the purpose set forth.

In testimony whereof I affix my signature in presence of two witnesses.

THEODOR OTTO.

Witnesses:
CARL BORNGRAEBER,
H. O. KAHLN.